United States Patent

Whitfill, Jr.

[15] 3,640,181
[45] Feb. 8, 1972

[54] SPIRAL TUBING CUTTER
[72] Inventor: William A. Whitfill, Jr., Houston, Tex.
[73] Assignee: Schlumberger Technology Corporation, New York, N.Y.
[22] Filed: June 2, 1969
[21] Appl. No.: 829,598

[52] U.S. Cl. .................................. 90/11.4, 29/2.21, 10/89
[51] Int. Cl. ............................................................ B23c 3/32
[58] Field of Search ..................... 90/11.4, 11.62, 20, 11.6; 82/5; 51/95.2, 103.1; 10/89; 29/2.21

[56] References Cited

UNITED STATES PATENTS

| | | | |
|---|---|---|---|
| 1,736,955 | 11/1929 | Welsh | 29/2.21 X |
| 1,809,880 | 6/1931 | Wise | 90/20 X |
| 2,378,302 | 6/1945 | Kline | 90/11.62 |
| 2,559,430 | 7/1951 | Hollengreen et al. | 51/103.1 |

*Primary Examiner*—Gil Weidenfeld
*Attorney*—Ernest R. Archambeau, Jr., David L. Moseley, Edward M. Roney, William R. Shermann and Stewart F. Moore

[57] ABSTRACT

Apparatus for producing lengths of helical- or spiral-shaped filler material for use in the manufacture of marine seismic streamers. The cutting apparatus includes means for applying a simultaneous longitudinal and rotational motion to a length of tubular filler material, together with cutting means to smoothly cut through the tubing wall and means for holding the tubing in place against the cutting means while it is being moved both longitudinally and rotationally with respect to the cutting means.

5 Claims, 3 Drawing Figures

PATENTED FEB 8 1972

3,640,181

William A. Whitfill, Jr.
INVENTOR

BY William J Beard

ATTORNEY

SPIRAL TUBING CUTTER

BACKGROUND OF THE INVENTION

This invention relates to the manufacture of cable and more particularly to the manufacture of solid marine seismic streamer cable for use in sensing in seismic waves reflected from subterranean earth formations.

In performing seismic exploration beneath the surface of the water it is conventional practice for ships to tow long seismic streamer cables behind them in the water. These cables generally carry detector apparatus such as seismic transducers or hydrophones which detect reflected acoustic wave energy and provide electrical signals representative thereof. A sound source such as dynamite is commonly utilized to introduce an acoustical wave front into the earth formations underlying the body of water being explored and the hydrophones pick up seismic waves reflected from geological structures in the underlying formations. Cables utilized for this purpose may typically be several thousands of feet long and comprise many cable sections connected in end-to-end relation. Each cable section generally contains a plurality of seismic transducers spaced longitudinally along its length together with coupling means at the end of the cable section for coupling the sections together and providing an electrical contact to the seismic transducers from one section to the others.

Typical prior art cables utilized for this purpose have been comprised of sealed hollow cable sections filled with a fluid which is electrically nonconducting such as oil, in order to maintain a neutral buoyance of the cables in the water. However, in the applicant's copending patent application entitled, "Solid Seismic Streamer," Ser. No. 759,448 filed Sept. 12, 1968 and now U.S. Pat. No. 3,531,760, and assigned to the assignee of the present invention, there is disclosed a solid marine seismic streamer which is an improvement over the prior art oil-filled cables. This solid seismic streamer has the advantage of a rugged physical construction together with the neutrally buoyant properties necessary for use as a marine seismic streamer. The solid seismic streamer described in the above-mentioned copending application is comprised of a plurality of layers of material disposed about a central strength member which may be a torque balanced wire rope or the like.

Among the overlying layers in the construction of the above-mentioned cable is a flexible filler layer which is disposed over the aforesaid strength member in the portions of the cable between the hydrophones. As previously discussed, the hydrophones are carried at longitudinally spaced intervals along the cable sections and are generally of a hollow cylindrical shape. The cable strength member passes through the hollow cylindrical form of the hydrophones along with the electrical conductors necessary to couple the hydrophones to shipboard recording apparatus.

As it would be undesirable in such a solid seismic streamer to have an intervening air space or void corresponding to the thickness of the hydrophones between the interior cable layers containing the wire rope and conductor members of the cable and the overlying sealing and flotation layers, it is desirable to have a solid filler material of approximately the same thickness as the cylindrical shell of the hydrophones disposed over the interior layers. By disposing a filler layer in such a manner, it is possible to provide a uniform diameter structure prior to the application of the outer sealing and flotation layers of the cable.

In order for such a seismic streamer cable to be flexible enough to be reeled in upon winches on the towing boat, however, it is desirable to provide added flexibility to the filler layer just discussed. This may be done in different manners such as by the utilization of a very soft or flexible material. If, on the other hand, it is desired to utilize a relatively stronger filler material which is not very flexible by itself, such a filler layer may be made as flexible as desired by shaping the layer into a helical or spiral coiled shape. The present invention is directed to the production of such a coiled- or helical-shaped filler layer.

Lengths of a flexible filler material, such as polyethylene or the like, of sufficient length to cover the longitudinal spaces between the hydrophones disposed on the cable may be produced by use of the present invention. A relatively thick-walled tubular form of the filler material is applied to the apparatus of the present invention. The relatively thick-walled tubular member is rendered more flexible by cutting the material in a spiral or helical manner to provide from the tube a helical-shaped coil of the material long enough to fill the spaces between the hydrophones of the seismic streamer.

The tubing cutter of the present invention provides means for simultaneously applying a rotational and longitudinal motion to sections of the tubing. By the application of such simultaneous rotational and longitudinal motion to the tubing while it is drawn across a cutting edge, a helical- or spiral-shaped cut is made through the wall of the tubing producing a coiled- or helical-shaped length of filler material which may then be disposed in position between the hydrophones on the cable.

The present invention includes means for providing a longitudinal translational motion to a relatively short section of the filler material tubing while simultaneously applying a rotary motion to the section. The apparatus of the present invention also includes means for cutting the tubing and means for holding the tubing in position on the cutter while it is being moved through the system.

The novel features of the present invention are set forth with particularity in the appended claims. The present invention both as to its organization and manner of operation together with further objects and advantages thereof may best be understood by way of illustration and an example of an embodiment when taken in conjunction with the accompanying drawings.

DESCRIPTION OF THE PREFERRED EMBODIMENT

Figure 3:
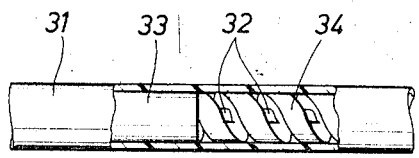
FIG. 3 is a perspective view partially in section showing the construction of a solid marine seismic streamer utilizing the helical or spiral coiled filler layer produced by the apparatus of the present invention.

Referring initially to FIG. 3, a marine seismic cable of solid construction utilizing the spiral or helically coiled flexible tubing produced by the present invention is shown in partial sectional view. The cable 31 is provided with an inner strength or support member 32 and is comprised of a plurality of layers which overlie the interior strength member 32. A plurality of hydrophones such as hydrophone 33 (shown partially obscured) are disposed at longitudinally spaced intervals along the length of the cable. Typically the hydrophones such as 33 may be disposed at two to three foot intervals along the length of the cable sections. The hydrophones may typically be hollow cylindrical-shaped forms of piezoelectric material which are sensitive to impinging acoustic pressure waves. Strength member 32, which may be a torque balanced wire rope or the like, passes coaxially through the hollow center of the hydrophones and extends along the entire length of the cable sections to provide longitudinal tensile strength for the cable.

As the exterior surface of the hydrophone 33 is of greater diameter than the longitudinal strength member 32 to make a solid cable, the space between the hydrophones is filled with a filler material such as the spiral- or helical-shaped tubing produced by the present invention. The filler material provides transverse load bearing capability for the cable and prevents longitudinal seepage of any moisture which may enter through the exterior cable layers and penetrate as far into the cable as the helical-shaped layer 34. In order to provide necessary flexibility to the cable the filler layer 34 which is disposed between the hydrophones is cut into a spiral or helical shape by the apparatus of the present invention.

Figure 2:
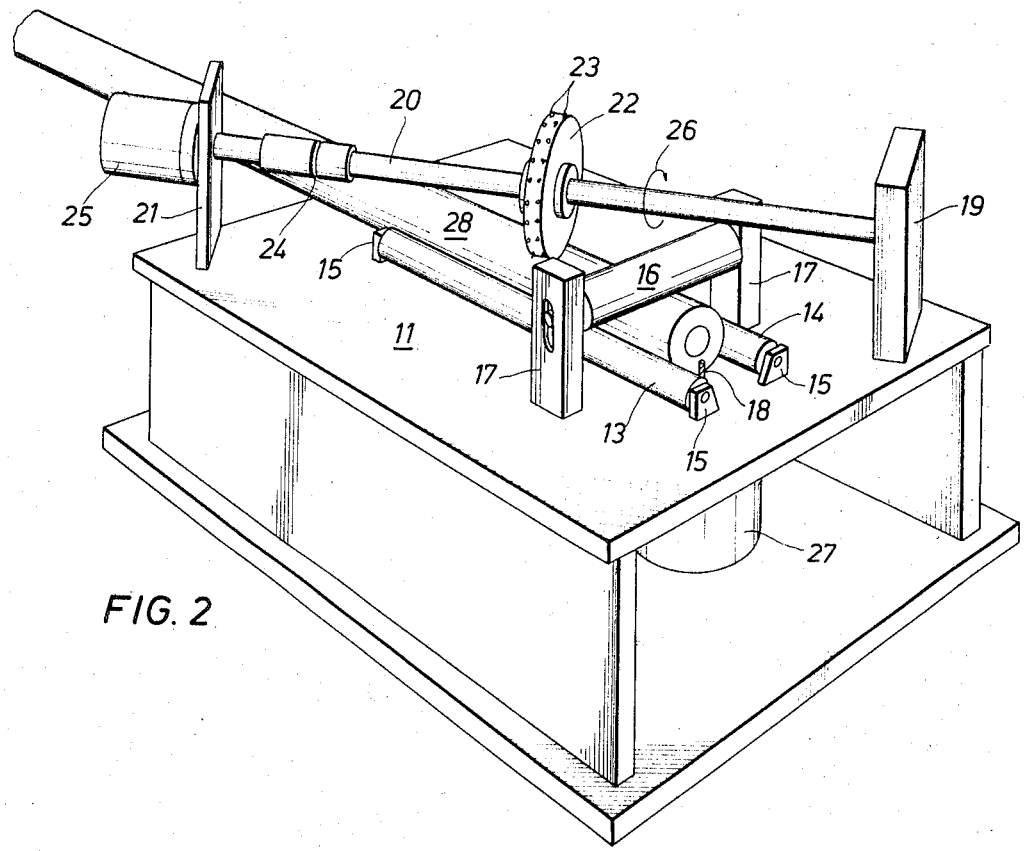
FIG. 2 is a perspective view of the apparatus of the present invention showing a section of tubing in position to be cut.
Figure 1:
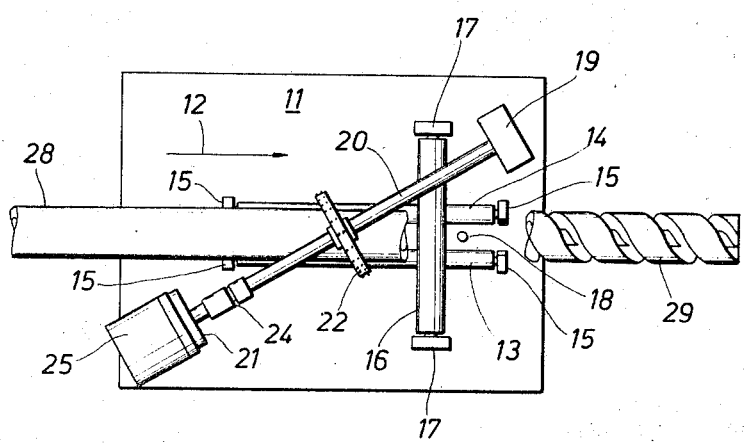
FIG. 1 is a top view of the apparatus of the present invention.

Referring now to FIGS. 1 and 2, the apparatus of the present invention for producing such a spiral- or helical-shaped coil of tubing may be more readily appreciated. A suitable base or supporting member 11 is used as a foundation for mounting the various components of the apparatus. The arrow 12 indicates the direction of motion of the flexible tubing through the apparatus of the present invention and this direction will henceforth be referred to as the longitudinal direction of motion.

The apparatus is provided with a pair of longitudinally mounted rollers 13 and 14 which are suspended above the surface of the base member 11 and secured in place by mounting brackets 15. The brackets 15 also contain bearings (not shown) which allow rotation of the rollers 13 and 14 about their longitudinal axes. Suspended above the rollers 13 and 14 by mounting brackets 17 is a transverse roller 16 which is biased downwardly by springs (not shown) in the upper portion of the mounting brackets 17. In addition to the spring biasing means, the mounting brackets 17 also include bearing means allowing the transverse roller 16 to rotate about its axis. Directly beneath the transverse roller 16 and between the longitudinal rollers 13 and 14 is a cutting blade 18 which may be powered by an electric motor 27 or the like mounted beneath the support member 11. The cutting blade 18 extends through a hole in the support member 11 for a short distance above the surface of the support member. The cutting blade 18 may be a steel instrument such as a router blade or the like and extends above the surface of support member 11 for a distance in excess of the wall thickness of the tubing to be cut.

Suspended still higher than the transverse roller 16 above the supporting surface by mounting brackets 19 and 21 is a diagonal shaft 20. The diagonal shaft 20 is spring biased toward the surface of support member 11 at one end by a biasing spring (not shown) contained in the mounting bracket 19. The opposite end of the shaft 20 is secured by a flexible shaft coupling 24 to the shaft of a source of rotary motion 25 which may be an electric motor or the like. The motor 25 powers the rotation of the shaft 20. The diagonal shaft 20 further is equipped with a driving wheel 22 which is secured to the portion of the shaft which crosses between the longitudinal rollers 13 and 14. The driving wheel 22 is equipped with gripping teeth 23 on its exterior surface.

The operation of the apparatus may be described as follows. A relatively short length of tubing material 28 such as polyethylene or the like, suitable for use in a marine seismic streamer is fed into the cutting apparatus and moves in the longitudinal direction of arrow 12 between the longitudinal rollers 13 and 14 as shown in FIG. 2. The length of tubing passes under the driving wheel 22 and under the transverse roller 16 and lies in the trough between the longitudinal rollers 13 and 14 which support it above the surface of the base member 11. When the power source 25, which drives the diagonal shaft 20 is activated, the diagonal shaft begins to turn clockwise as indicated by the circular arrow 26. At this time the power source driving the cutting blade 18 is also activated and the cutting blade begins its rotational motion.

When the driving wheel 22 begins to rotate, the teeth 23 along its exterior surface engage the exterior surface of the tubing and begin to rotate the section of tubing about its longitudinal axis between the longitudinal rollers 13 and 14. However, since the diagonal shaft 20 is not mounted at right angles to the line of motion of the tubing, the tubing is also pulled longitudinally in the direction of the arrow 12 through the system by the action of the driving wheel 22. Thus, the tubing is driven longitudinally through the system while simultaneously being rotated, this motion being imparted to the tubing section by the driving wheel 22. As the tubing is driven in this manner through the system it passes over the cutting blade 18 which is rotating at a high speed and which protrudes through the surface 11 sufficiently to penetrate the wall thickness of the tubing. The result of this operation is to produce a helical-shaped cut of roughly the same width as the diameter of the cutting blade 18 through the wall of the tubing rendering the tubing into a spiral or helical shape 29 after the cutting operation is finished.

Since the transverse roller 16 and the diagonal shaft 20 are spring biased downwardly toward the surface of the mounting member 11, any vertical vibration of the tubing section is absorbed by these spring mountings and the tubing is urged in a steady fashion against the cutting edge 18. This allows the cutting edge to make a relatively smooth incision through the wall of the tubing. If desired, a small high-speed fan or suction arrangement (not shown) may be utilized in the area between the longitudinal rollers 13 and 14 in order to catch or dispel any cuttings of material from the tubing which might otherwise interfere with the smooth passage of the tubing through the apparatus.

While one particular embodiment of the present invention has been shown and described, it is apparent that changes may be made without departing from this invention in its broader aspects, and therefore the aim in the appended claims is to cover all such changes and modifications as fall within the true spirit and scope of this invention.

What is claimed is:

1. Apparatus for use in the manufacture of relatively short lengths of helical shaped filler material for use in marine seismic streamers comprising:
   a support member;
   plural longitudinal rollers mounted on said support member and adapted for rotational motion about their longitudinal axes;
   a transverse roller mounted on said support member above said longitudinal rollers and spring biased downwardly toward said support member;
   a shaft mounted on said support member above said transverse roller and extending diagonally across said longitudinal rollers;
   a driving wheel secured to said shaft on the portion thereof which traverses said longitudinal rollers;
   means for rotating said shaft; and
   cutting means extending upwardly from said support members in the portion thereof between said longitudinal rollers,
   whereby the rotation of said shaft imparts a simultaneous rotational and longitudinal motion to a length of the tubing disposed along said longitudinal rollers, urging the tubing across said cutting means in such a manner that said cutting means makes a helical-shaped cut through the wall of the tubing.

2. Apparatus for manufacturing helical shaped lengths of filler material for use in the manufacture of cables comprising:
   a base member;
   cutting means extending through said base member;
   support means mounted longitudinally on said base member on either side of said cutting means and adapted for rotational movement about a longitudinal axis;
   means mounted transversely on said base member above said support means and adapted for rotation about a transverse axis for holding a length of tubular material snugly against said support means and said cutting means; and
   means mounted on said base member for supplying simultaneous longitudinal translation and rotational motion to the length of tubular material thereby drawing the tubing across said cutting means while the tubing is both translating and rotating.

3. The apparatus of claim 2 wherein said supporting means comprises a pair of longitudinally extending rollers.

4. The apparatus of claim 2 wherein said means for snugly holding the length of tubular material against said support means comprises a transversely mounted roller spring biased toward said support means and said cutting means.

5. The apparatus of claim 2 wherein said means for supplying simultaneous longitudinal and rotational motion to the length of tubular material comprises a shaft mounted diagonally on said base member with respect to said support means and above said support means said shaft being equipped with a driving wheel mounted on the portion of said shaft which traverses said support means, and means for rotating said diagonally mounted shaft and said driving wheel.

* * * * *